United States Patent
Gunnarsson et al.

(10) Patent No.: US 10,708,881 B2
(45) Date of Patent: Jul. 7, 2020

(54) METHODS AND APPARATUSES FOR POSITIONING BASED ON SIGNAL CORRELATION FUNCTION CHARACTERISTICS FEEDBACK

(71) Applicant: TELEFONAKTIEBOLAGET LM ERICSSON (PUBL), Stockholm (SE)

(72) Inventors: Fredrik Gunnarsson, Linköping (SE); Sara Modarres Razavi, Linköping (SE); Henrik Rydén, Solna (SE); Meng Wang, Sundbyberg (SE); Ali Zaidi, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/577,674

(22) Filed: Sep. 20, 2019

(65) Prior Publication Data

US 2020/0015188 A1    Jan. 9, 2020

Related U.S. Application Data

(63) Continuation of application No. 15/748,015, filed as application No. PCT/SE2016/050754 on Aug. 15, 2016, now Pat. No. 10,433,276.

(Continued)

(51) Int. Cl.
*H04W 64/00* (2009.01)
*G01S 1/20* (2006.01)
(Continued)

(52) U.S. Cl.
CPC .......... *H04W 64/003* (2013.01); *G01S 1/045* (2013.01); *G01S 1/20* (2013.01); *G01S 5/0221* (2013.01);
(Continued)

(58) Field of Classification Search
CPC ..... H04W 64/00; H04W 64/003; G01S 1/045; G01S 5/021; G01S 5/0257; G01S 5/06
See application file for complete search history.

(56) References Cited

U.S. PATENT DOCUMENTS 8,184,504 B2    5/2012   Altman et al.
8,428,022 B2    4/2013   Frank et al.
(Continued)

FOREIGN PATENT DOCUMENTS

AU    2016202291 A1    5/2016
CN    101730851 A      6/2010
(Continued)

OTHER PUBLICATIONS

International Search Report and Written Opinion dated Oct. 4, 2016, in International Application No. PCT/SE2016/050754, 11 pages.
(Continued)

*Primary Examiner* — Diane D Mizrahi
(74) *Attorney, Agent, or Firm* — Rothwell, Figg, Ernst & Manbeck, P.C.

(57) ABSTRACT

A method, apparatus, and system are provided for facilitating positioning based on signal correlation function characteristic feedback. In an embodiment, the method may involve steps performed by a network node in communication with a wireless communication device (WCD) and a plurality of base stations. The network node receives, from the WCD, location information including position reference signal (PRS) correlation function characteristics of a cross-correlation between a received downlink signal and a transmitted PRS for each base station from the plurality of base stations. The network node determines a position of the WCD using the PRS correlation function characteristics. The WCD may initiate the transmission of the PRS corre- (Continued)

lation function characteristics on its own, or in response to a request to do so from the network node.

20 Claims, 17 Drawing Sheets

Related U.S. Application Data

(60) Provisional application No. 62/205,325, filed on Aug. 14, 2015.

(51) Int. Cl.
    *G01S 5/02* (2010.01)
    *G01S 5/10* (2006.01)
    *G01S 1/04* (2006.01)
    *H04L 29/08* (2006.01)
    *G01S 11/08* (2006.01)

(52) U.S. Cl.
    CPC ............... *G01S 5/10* (2013.01); *H04L 67/04* (2013.01); *H04W 64/00* (2013.01); *G01S 5/02* (2013.01); *G01S 11/08* (2013.01)

(56) References Cited

U.S. PATENT DOCUMENTS

| | | | |
|---|---|---|---|
| 9,591,438 | B2 | 3/2017 | Raghupathy et al. |
| 9,774,431 | B2 | 9/2017 | Agrawal et al. |
| 10,433,276 | B2 * | 10/2019 | Gunnarsson .............. G01S 5/10 |
| 2010/0317343 | A1 | 12/2010 | Krishnamurthy et al. |
| 2011/0176499 | A1 | 7/2011 | Siomina et al. |
| 2012/0051445 | A1 | 3/2012 | Frank et al. |
| 2012/0208552 | A1 | 8/2012 | Siomina et al. |
| 2013/0051317 | A1 | 2/2013 | Ji et al. |
| 2013/0267258 | A1 | 10/2013 | Yeo et al. |
| 2014/0057664 | A1 | 2/2014 | Pei |
| 2014/0141799 | A1 * | 5/2014 | Rousu .................. G01S 19/235 455/456.1 |
| 2015/0105097 | A1 | 4/2015 | Sun et al. |
| 2015/0208271 | A1 | 7/2015 | Love et al. |
| 2015/0327018 | A1 * | 11/2015 | Rehnberg .............. H04W 64/00 370/252 |
| 2016/0025906 | A1 | 9/2016 | Raghupathy et al. |
| 2016/0259062 | A1 | 9/2016 | Raghupathy et al. |
| 2019/0220703 | A1 * | 7/2019 | Prakash ................ G06F 9/5044 |

FOREIGN PATENT DOCUMENTS

| | | |
|---|---|---|
| CN | 102204396 A | 9/2011 |
| CN | 102273123 A | 12/2011 |
| CN | 102833849 A | 12/2012 |
| CN | 103338513 A | 10/2013 |
| EP | 2747498 A1 | 6/2014 |
| EP | 2876951 A1 | 5/2015 |
| WO | 2010030825 A1 | 3/2010 |
| WO | 2013003636 A2 | 1/2013 |
| WO | 2014093400 A1 | 6/2014 |
| WO | 2016048509 A1 | 3/2016 |

OTHER PUBLICATIONS

Jeff A. Bilmes "A Gental Tutorial of the EM Algorithm and its Application to Parameter Estimation for Gaussian Mixture and Hidden Markov Models" International Computer Science Institute, 1998, 15 pages.
3GPP, LTE; Evolved Universal Terrestrial Radio Access (E-UTRA); LTE Positioning Protocol (LPP) (3GPP TS 36.55 version 9.2.1 Release 9), ETSI TS 136 355 V9.2.1, 2010, 114 pages.
Extended European Search Report dated Mar. 1, 2019 for European Patent Application No. EP16837396.7, 7 pages.
First Chinese Office Action dated Oct. 22, 2019, issued in Chinese Patent Application No. 201680048419.1, 10 pages.
Extended Search Report issued in corresponding European Application No. 19211693.7, dated Apr. 17, 2020, 6 pages.

\* cited by examiner

```
-- ASN1START

OTDOA-SignalMeasurementInformation ::= SEQUENCE {
    systemFrameNumber       BIT STRING (SIZE (10)),
    physCellIdRef           INTEGER (0..503),
    cellGlobalIdRef         ECGI                        OPTIONAL,
    earfcnRef               ARFCN-ValueEUTRA            OPTIONAL,   -- Cond NotSameAsRef0
    referenceQuality        OTDOA-MeasQuality           OPTIONAL,
    cfcInfo                 CFCInfo                     OPTIONAL,
    neighbourMeasurementList  NeighbourMeasurementList,
    ...,
    [[ earfcnRef-v9a0       ARFCN-ValueEUTRA-v9a0       OPTIONAL    -- Cond NotSameAsRef1
    ]]
}

NeighbourMeasurementList ::= SEQUENCE (Size(1..24)) OF NeighbourMeasurementElement NeighbourMeasurementElement ::= SEQUENCE {
    physCellIdNeighbour     INTEGER (0..503),
    cellGlobalIdNeighbour   ECGI                        OPTIONAL,
    earfcnNeighbour         ARFCN-ValueEUTRA            OPTIONAL,   -- Cond NotSameAsRef2
```

FIG. 9

```
CFCInfo ::= SEQUENCE (SIZE(1..MaxPeaks)) OF CFCInfoElement

CFCInfoElement ::= SEQUENCE {
    relTimeLag      INTEGER (0..maxLag),
    weightPeak      INTEGER (0..10)       OPTIONAL,
    stdPeak         INTEGER (0..maxStd)   OPTIONAL,
    ...
}
```

FIG. 13

METHODS AND APPARATUSES FOR POSITIONING BASED ON SIGNAL CORRELATION FUNCTION CHARACTERISTICS FEEDBACK

CROSS REFERENCE TO RELATED APPLICATION(S)

This application is a continuation of U.S. application Ser. No. 15/748,015, filed Jan. 26, 2018, which is a 35 U.S.C. § 371 National Phase Entry Application from PCT/SE2016/050754, filed Aug. 15, 2016, designating the United States, and also claims the benefit of U.S. Provisional Application No. 62/205,325, filed Aug. 14, 2015. The disclosures of each of the referenced applications are incorporated herein in their entirety by reference.

TECHNICAL FIELD

This disclosure relates to apparatuses and methods for positioning based on signal correlation function characteristics feedback.

BACKGROUND

In a telecommunications system such as a LTE system, the position of a user's wireless communication device (WCD) (e.g., a UE) may be tracked by the system's core network for purposes such as authorization of services, billing, customer care, or to comply with certain legal requirements. This location information, which approximates the location of a WCD, may be reported by a base station (e.g., an eNB) to a mobility management apparatus (e.g., mobility management entity (MME)) to which the WCD is attached. This location information allows the core network to track the WCD's location.

LTE makes available the following positioning strategies (i.e., position determination techniques): i) Enhanced Cell ID (e-CID); ii) Assisted Global Navigation Satellite System (GNSS); iii) Observed Time Difference of Arrival (OT-DOA); and iv) Uplink Time Difference of Arrival (UT-DOA).

In the e-CID approach, cell ID information associates a UE with a serving area of a serving cell. Additional information can improve granularity of the position determination.

In the Assisted GNSS approach, the UE may retrieve GNSS information, and may be supported by assistance information provided to the UE from an enhanced or evolved serving mobile location center (E-SMLC).

In the OTDOA approach, the UE may estimate a time difference of reference signals from different base stations, and send that time difference measurement to the E-SMLC for multilateration.

In the UTDOA approach, the UE is requested to transmit a specific waveform that is detected by multiple location measurement units (e.g., an eNB) at known positions. These measurements are forwarded to an E-SMLC for multilateration. The OTDOA approach is a WCD-assisted (e.g., UE-assisted) method, in which a WCD measures the time of arrival (TOA) of specific positioning reference signals (PRS) from multiple eNBs, and computes the relative differences. These reference signal time difference (RSTD) are quantized and reported via, for example, a LPP link to the E-SMLC together with an accuracy assessment. Based on known positions of eNBs and their mutual time synchronization, it is possible for the E-SMLC to estimate the WCD's position from the RSTD and covariance reports by using multilateration. The accuracy may depend on the radio conditions of the received signals, number of received signals as well as the deployment, which means that it may vary spatially.

The TOA estimation based on thresholding may give significant TOA estimation errors if the threshold is too high like in FIG. 4, or too low like in FIG. 5. It is difficult for one of ordinary skill in the art to specify a threshold-based algorithm for TOA estimation that can handle all possible cases without introducing a significant bias at times, which is significantly disadvantageous.

In existing solutions, the UE reported RSTD measurement and its corresponding accuracy assessment do not accurately reflect the error caused by multipath. Based on the PRS cross correlation, the UE associates an RSTD measurement with an uncertainty in meters, hence the format does not reflect the error characteristics from multipath and useful information is lost. As shown in FIG. 3, since the cross correlation typically gives a set of candidate time estimates (e.g., the distinct peaks), a reporting format that reflects the cross correlation results is therefore desirable.

SUMMARY

According to some embodiments, method is performed in a network node in communication with a wireless communication device (WCD) and a plurality of base stations. The method includes the network node receiving, from the WCD, location information including position reference signal (PRS) correlation function characteristics of a cross-correlation between a received downlink signal and a transmitted PRS for each base station from the plurality of base stations. The method further includes the network node determining a position of the WCD using the PRS correlation function characteristics.

According to some embodiments, a method is performed in a wireless communication device (WCD) in communication with a network having a network node and a plurality of base stations. The method includes the WCD determining, a cross-correlation between a received downlink signal and a transmitted Position Reference Signal (PRS) for each base station from the plurality of base stations. The method includes the WCD determining, based on the determined cross-correlation, PRS correlation function characteristics. The method further includes the WCD transmitting the PRS correlation function characteristics to the network node.

In some embodiments, a network node is configured to communicate with a wireless communication device (WCD) and a plurality of base stations. The network node includes a processing circuit and a computer readable medium coupled to the processing circuit, where the computer readable medium contains instructions executable by the processing circuit. The network node is operative to receive, from the WCD, location information including position reference signal (PRS) correlation function characteristics of a cross-correlation between a received downlink signal and a transmitted PRS for each base station from the plurality of base stations. The network node is further operative to determine a position of the WCD using the PRS correlation function characteristics.

In some embodiments, a wireless communication device (WCD) is configured to communicate with a network having a network node and a plurality of base stations. The WCD includes a processing circuit and a computer readable medium coupled to the processing circuit. The computer readable medium contains instructions executable by the processing circuit. The WCD is operative to determine a cross-correlation between a received downlink signal and a transmitted Position Reference Signal (PRS) for each base station from the plurality of base stations. The WCD is further operative to determine, based on the determined cross-correlation, PRS correlation function characteristics. The WCD is further operative to transmit the PRS correlation function characteristics to the network node.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 9 illustrates an exemplary report message.

FIG. 13 illustrates an exemplary message information element.

DETAILED DESCRIPTION

Figure 1:
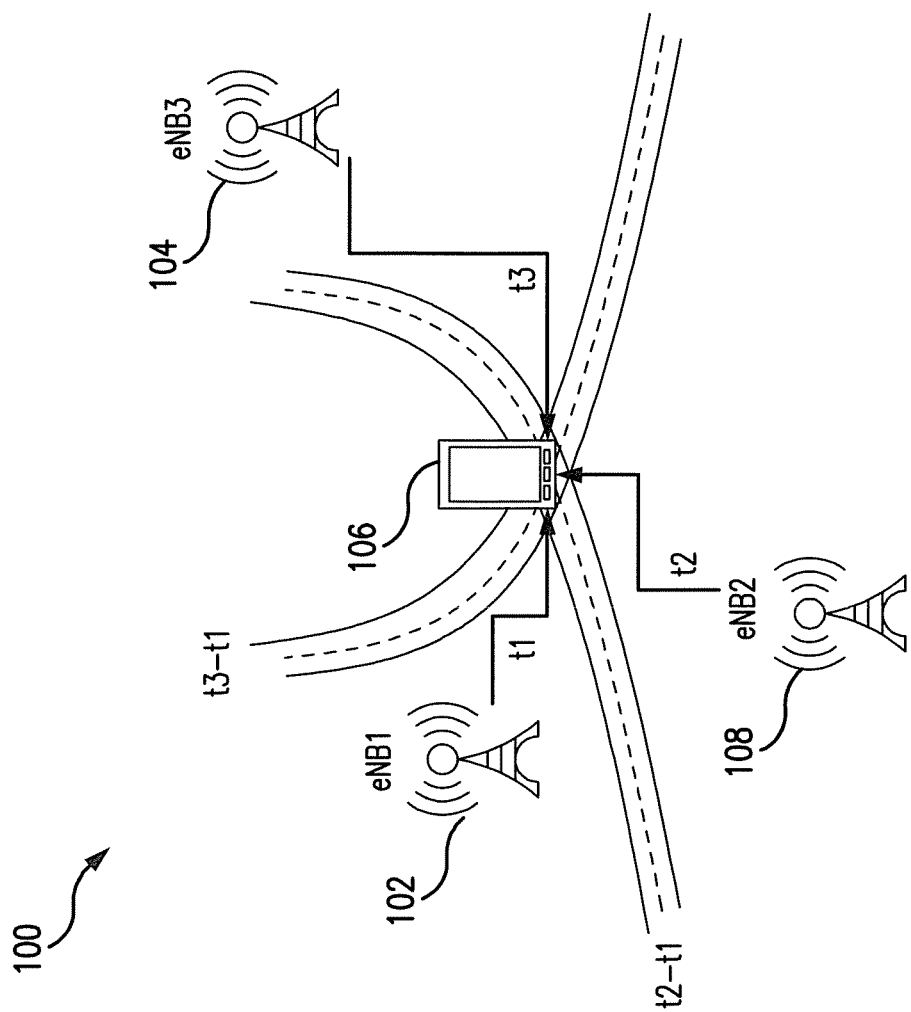
FIG. 1 illustrates an exemplary Observed Time Difference of Arrival (OTDOA) diagram.

FIG. 1 illustrates an example system 100 for implementing the OTDOA position determination approach. In the example, a WCD such as UE 106 may detect multiple downlink (DL) signals (e.g., positioning reference signals (PRSs)) transmitted by a plurality of base stations, such as eNB 102, eNB 104, and eNB 108. It may make measurements on such signals, such as a time of arrival (TOA) measurement. The TOA measurement may refer to, for example, a calculation by the WCD of a time it took for one of the DL signals to arrive at the UE 106, or a calculation by the WCD of a difference in arrival times of two DL signals. The latter calculation may be a reference signal time difference (RSTD) measurement, which is discussed in more detail in 3GPP TS 36.305.

The TOA measurement may be used in multiple RSTD measurements or other measurements. One example is the TOA measurement of the reference cell which is used in all RSTD measurements by the WCD.

Figure 2:
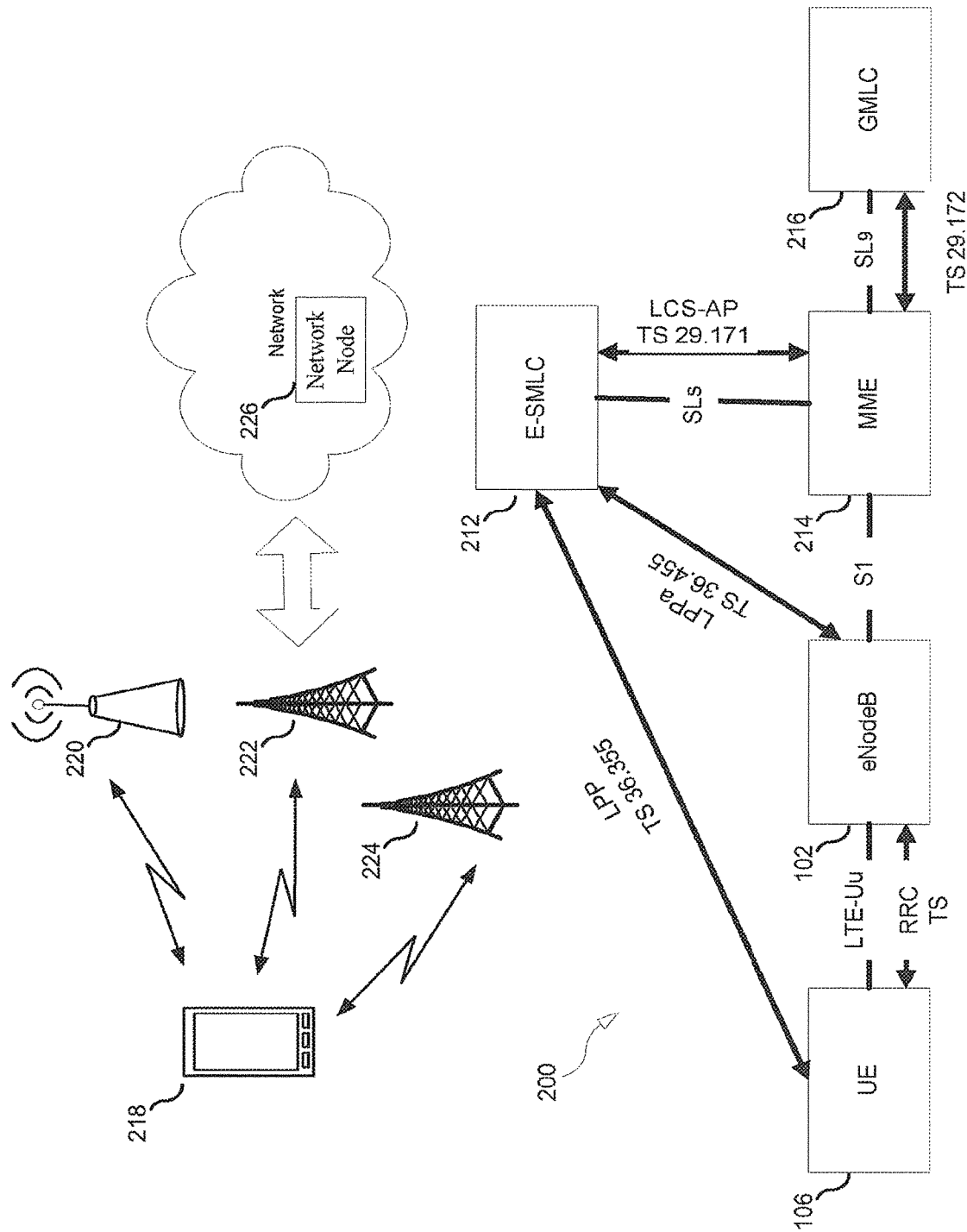
FIG. 2 illustrates an exemplary wireless communication network.

FIG. 2 illustrates a system 200 for performing location determination. In this system, the WCD is UE 106, the base station is eNodeB 102, the network is an EPC/SAE network, and the network node is location server, such as E-SMLC 212. The EPC/SAE network may also include other core network nodes such as mobility management entity (MME) 254 and gateway mobile location center (GMLC) 216. The system 200 supports direct interactions between a UE and a location server (E-SMLC) via the LTE Positioning Protocol (LPP). There may also be interactions between the location server and the eNodeB 102 via the LPPa protocol, which may be supported to an extent by interactions between the eNodeB 102 and the UE 106 via the Radio Resource Control (RRC) protocol.

Figure 3:
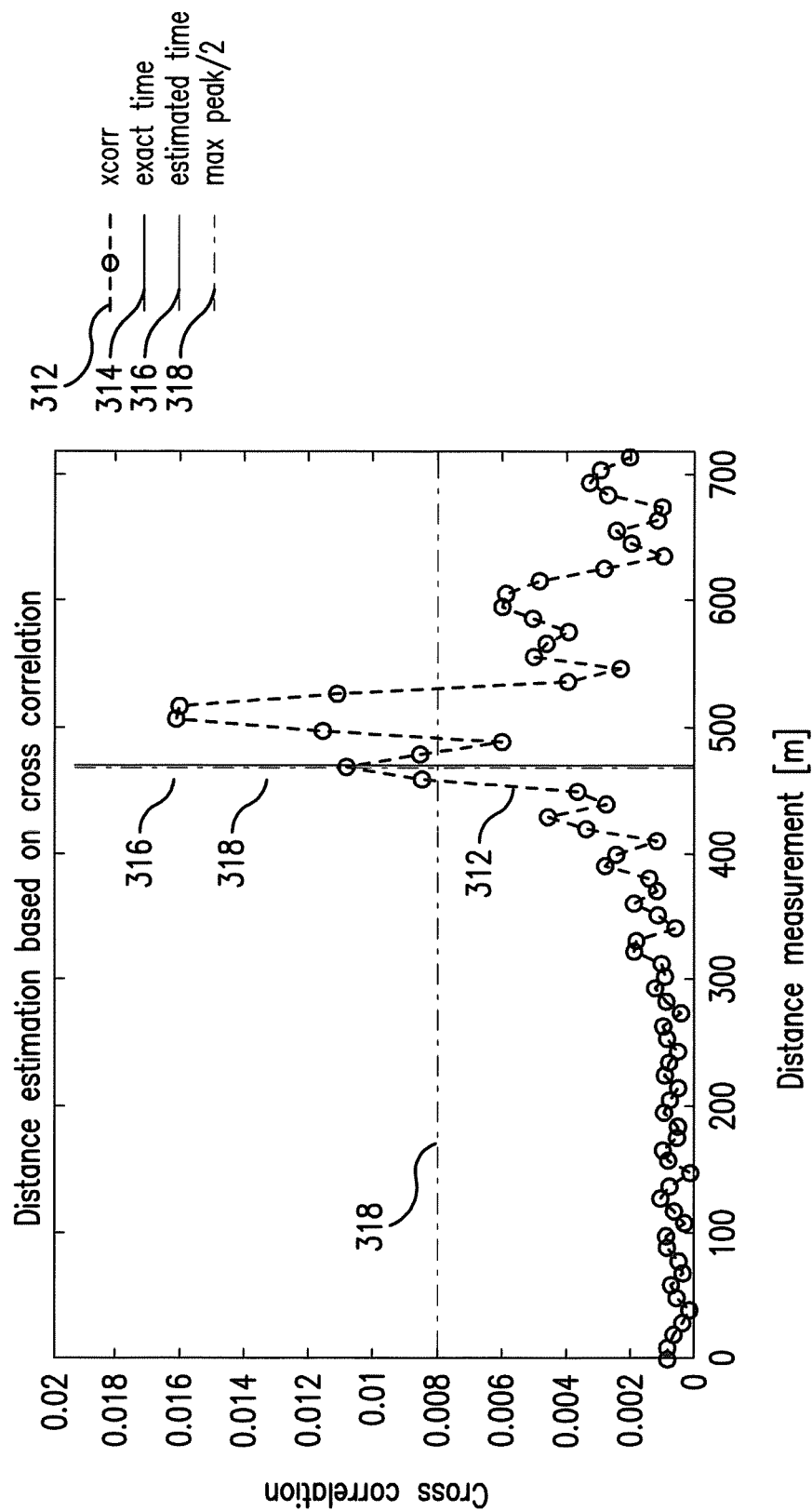
FIG. 3 illustrates an exemplary cross-correlation diagram.

There are multiple techniques and/or parameter values for determining a TOA measurement. One set of techniques involve 1) calculating a channel impulse response (CIR) and 2) finding a first "tap"" of the CIR, which may be a first peak that is above a threshold value. The CIR may reflect multipath fading effects in the channel by which the WCD received a DL signal from a base station, noise in the channel, and/or other characteristics of the channel. As discussed in more detail below, the CIR may be calculated as a cross-correlation function. FIG. 3 illustrates an example cross-correlation function 312 that represents a CIR of a signal channel between a WCD and a base station. While FIG. 3 shows the X-axis in a unit of distance, the X-axis may also be shown in a unit of time, since the two units are related by the distance by which the DL signal propagates per unit of time (e.g., the values on the X-axis may be converted to time by dividing them by the speed of a radio signal in air). The first "tap" may be determined as a first peak in the CIR above threshold 318. The first "tap" may thus be an estimated time or distance 316. FIG. 3 compares the estimated time or distance 316 against the actual time or distance 314 (e.g., the actual time it took for the radio signal to arrive at the WCD, or the actual distance between the WCD and the transmitting base station).

According to some embodiments of determining the CIR is determined as follows: a WCD may receives a downlink positioning reference signal (PRS) y, and compare the received PRS y against the PRS x that was transmitted. The PRS x is transmitted from the eNBs and received by the WCD. The PRS x that is transmitted can be indicated to the WCD for example via LPP from the E-SMLC to the WCD. Or more generally, the PRS x can be indicated form any network node. The PRS y may be transmitted from the eNBs periodically, or triggered when for example when the E-SMLC request the position of a WCD. The WCD can receive the PRS y periodically, or upon request from a network node such as the E-SMLC. The PRS x that was transmitted may have a predetermined waveform or set of values, and this information may already be stored on the WCD. The WCD may calculate the CIR as a cross-correlation $R(\tau)$ of y and x:

$$R(\tau) = \sum_{i=0}^{K} y[i]x^*[i-\tau], \quad (1)$$

where K is the length of the received signal y and *( ) denotes the complex conjugate. K is the number of samples per subframe times the number of consecutive PRS subframes. In some embodiments, the cross correlation is computed per positioning occasion. That is, the PRS y may be transmitted by a base station periodically, on multiple occasions. Each occasion on which the PRS y is received by the WCD may be a separate positioning occasion. In some embodiments, positioning occasions may be consolidated, by combining the measurements to calculate:

$$R_{ave}(\tau) = \frac{1}{|S|} \sum_{s \in S} |R_s(\tau)|, \quad (2)$$

where S is the set of CIR estimates. S may be constrained by the number of receiver antennas and the number of positioning occasions. The absolute value of the CIR may correspond to a power delay profile (PDP) of the channel. The operation in (2) may therefore be an averaging of the PDP of the positioning occasions and receiver antennas.

In this example, according to some embodiments, once the average cross-correlation function is calculated, a time or distance (e.g., corresponding to time of arrival) may be calculated as:

$$\hat{\tau} = \arg\min\left\{\frac{R_{ave}(\tau)}{\max\{R_{ave}\}} \geq \zeta\right\}. \quad (3)$$

This step may be generalized as obtaining the distinct peaks by looking for downward zero-crossings in the first derivative (where the slope is flat), and picking one based on a predetermined policy policy, such as picking the first peak that is above a threshold, as illustrated in FIG. 3. As understood by one of ordinary skill in the art, the predetermined policy is not limited to selecting the first peak, and may take into account any desired number of peaks.

Embodiments are directed to richer PRS feedback from the UE to the network node. According to some embodiments, instead of thresholding the correlation function to estimate one TOA, the UE identifies PRS correlation function characteristics (CFC) such as distinct peaks and one or more of associated time lags, peak widths, and cross-correlation values of the peak. The PRS correlation function characteristics may correspond to statistical properties of the PRS correlation function. These embodiments avoid thresholding to estimate one TOA, which excludes much of the significant information, and instead provide PRS correlation function characteristics feedback to the network node.

According to some embodiments, the UE may consider multiple PRS transmissions from the same cell over time. In some embodiments, the UE combines data from all received PRS occasions to estimate an aggregate PRS correlation information, from which the PRS correlation function characteristics is determined. According to some embodiments the data is grouped from different PRS occasions into two or more groups, and estimate PRS correlation information for each group. Then, the PRS correlation function characteristics comprises information from multiple time instances, one per group.

Figure 6:
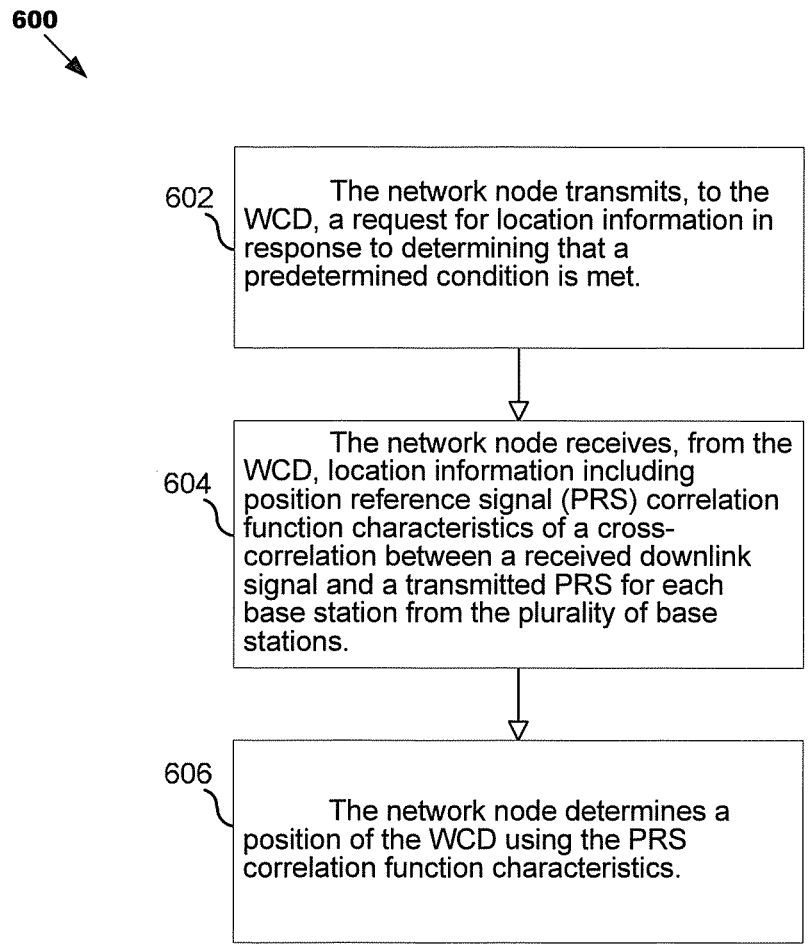
FIG. 6 is an exemplary flow chart illustrating a process according to some embodiments.

FIG. 6 illustrates an embodiment of a process 600 performed by a network node. The network node may be in communication with a wireless communication device (WCD) and a plurality of base stations. The process may start at step 602 where the network node transmits, to the WCD, a request for location information in response to determining that a predetermined condition is met. In step 604, the network node receives, from the WCD, location information including position reference signal (PRS) correlation function characteristics of a cross-correlation between a received downlink signal and a transmitted PRS for each base station from the plurality of base stations. In step 606, the network node determining a position of the WCD using the PRS correlation function characteristics.

In some embodiments, the PRS correlation function characteristics include a reference cell peak of a reference cell and a reference time associated with the reference cell peak. In some embodiments, the reference cell peak is one of the first peak above a predefined threshold, the largest peak above the threshold, and the last peak above the threshold. In some embodiments, the PRS correlation function characteristics further include a reference signal time difference (RSTD) for each neighbor cell relative to the reference cell.

In some embodiments, the RSTD indicates a time lag of one of a first peak above a predefined threshold relative to the reference peak, a largest peak above the predefined threshold relative to the reference peak, and a last peak above the threshold relative to the reference peak. In some embodiments, the PRS correlation function characteristics further include a width of each peak above a predefined threshold.

In some embodiments, the determining that the predetermined condition is met includes transmitting a capability request to the WCD, and receiving, from the WCD in response to the capability request, a response indicating that the WCD is configured to support PRS correlation function characteristics feedback. In some embodiments, the determining that the predetermined condition is met includes determining whether an emergency call is received.

In some embodiments, the process further includes transmitting, to the WCD, assistance data that supports preparation of the PRS correlation function characteristics data. In some embodiments, the PRS correlation function characteristics further include a cross-correlation value of each peak above a predefined threshold. In some embodiments, the received downlink signal is a PRS signal received from one of the base stations from the plurality of base stations, and the transmitted PRS is a predetermined waveform or set of values transmitted from each base station to the WCD and stored on the WCD.

Figure 7:
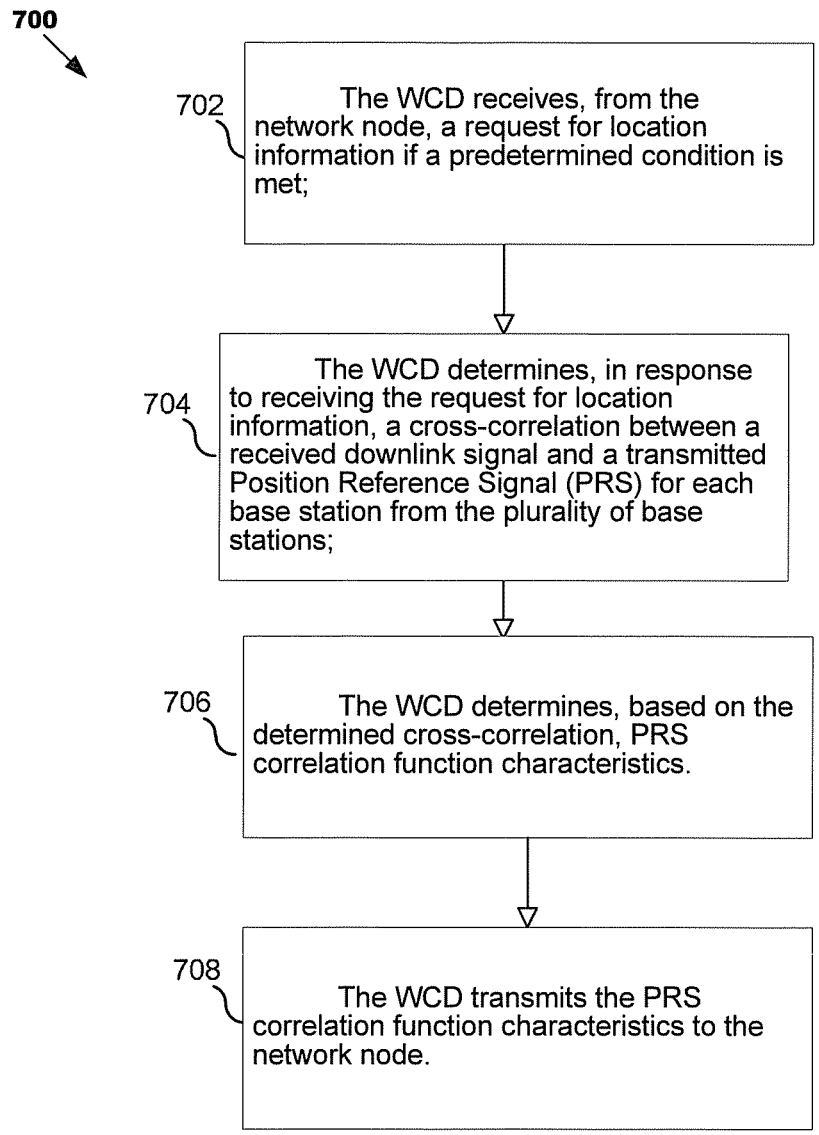
FIG. 7 is an exemplary flow chart illustrating a process according to some embodiments.

FIG. 7 illustrates an embodiment of a process 700 performed by a WCD. The WCD may be in communication with a network node and a plurality of base stations. The process may start at step 702 where the WCD receives, from the network node, a request for location information if a predetermined condition is met. In step 704, the WCD determines, in response to receiving the request for location information, a cross-correlation between a received downlink signal and a transmitted Position Reference Signal (PRS) for each base station from the plurality of base stations. In step 706, the WCD determines, based on the determined cross-correlation, PRS correlation function characteristics. In step 708, the WCD transmits the PRS correlation function characteristics to the network node.

In some embodiments, the PRS correlation function characteristics include a reference cell peak of a reference cell and a reference time associated with the reference cell peak. In some embodiments, the reference cell peak is one of the first peak above a predefined threshold, the largest peak above the threshold, and the last peak above the threshold. In some embodiments, the PRS correlation function characteristics further include a reference signal time difference (RSTD) for each neighbor cell relative to the reference cell.

In some embodiments, the RSTD indicates a time lag of one of a first peak above a predefined threshold relative to the reference peak, a largest peak above the predefined threshold relative to the reference peak, and a last peak above the threshold relative to the reference peak. In some embodiments, the PRS correlation function characteristics further include a width of each peak above a predefined threshold.

In some embodiments, the PRS correlation function characteristics further include a cross-correlation value of each peak above a predefined threshold. In some embodiments, the predetermined condition specifies that the WCD is configured to support PRS correlation function characteristics feedback. In some embodiments, the predetermined condition specifies that an emergency call is received. In some embodiments, the process further includes receiving, from the network node, assistance data that supports preparation of the PRS correlation function characteristics data.

In some embodiments, the process further includes receiving, from the network node, a request for location information if a predetermined condition is met, the WCD transmitting the PRS correlation function characteristics in response to the request. In some embodiments, the received downlink signal is a PRS signal received from one of the base stations from the plurality of base stations, and the transmitted PRS is a predetermined waveform or set of values transmitted from each base station to the WCD and stored on the WCD.

Figure 8:
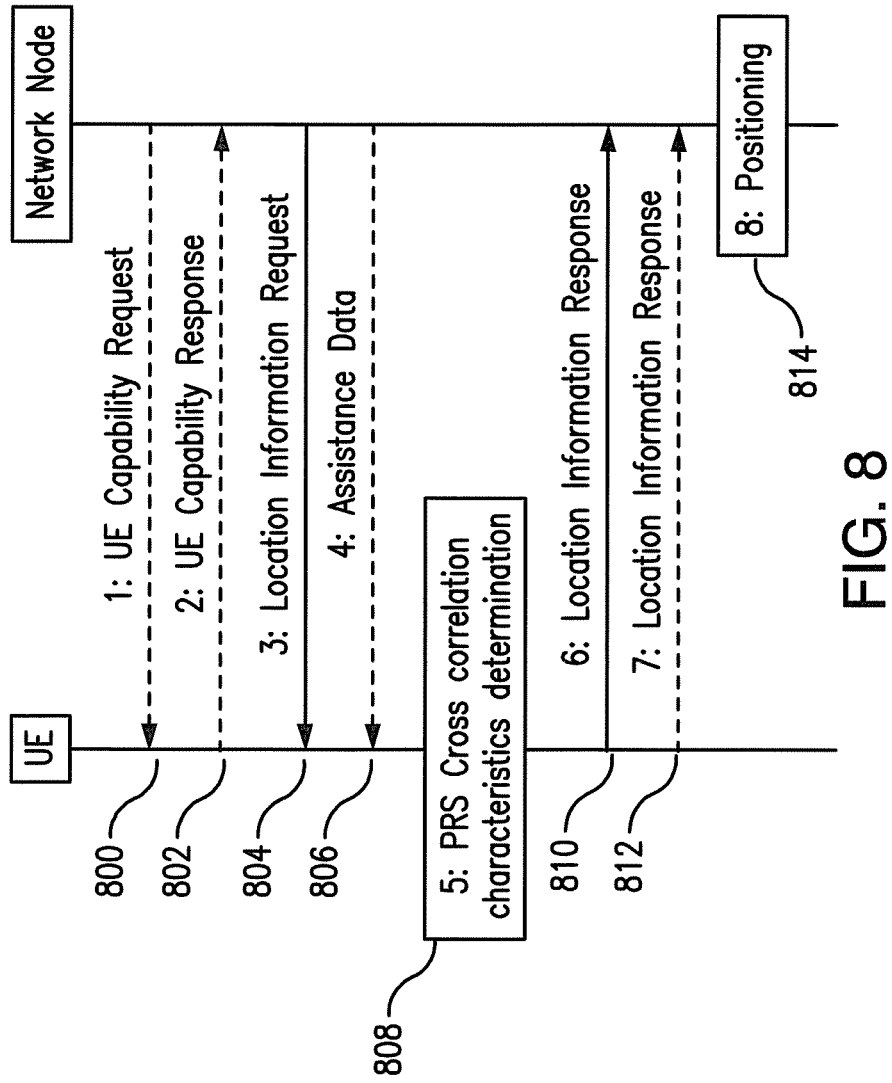
FIG. 8 illustrates an exemplary signal flow diagram.

FIG. 8 illustrates an embodiment of a signal flow between a WCD such as a UE and a network node. The network node may be a location server/E-SMLC or a radio base station or radio network controller node. When the network node is a location server/E-SMLC, the signaling protocol may be LPP/LPPe. When the network node is a base station/radio network controller, the signaling protocol may be RRC. The network node may also forward the location information to yet another node for the positioning calculations.

Step 800. The network node sends a capability request to the UE. This step may be optional.

Step 802. If supported, the UE responds with information about support for PRS correlation function characteristics feedback.

Step 804. The network node sends a request for location information, for example triggered by an emergency call.

Step 806. The network node also provides the UE with assistance data to support the preparation of the PRS correlation function characteristics data. This step may be optional.

Step 808. The UE observes PRS occasions and determines PRS correlation function characteristics data.

Step 810. The UE sends location information with the determined PRS correlation function characteristics to the network node.

Step 812. The UE sends location information at two or more time instances. This step may be optional.

Step 814. The network node uses the PRS correlation function characteristics for UE positioning. Optionally, these calculations are performed in a different node. FIG. 9 illustrates an embodiment of at least a part of a Location Information Report message, with the new attribute CFC Info (Correlation Function Information).

According to some embodiments, the PRS correlation function characteristics (CFC) describe the estimated PRS correlation in a condensed manner. For example, the PRS CFC encodes TOA correlation information for both reference cell and neighbor cells, which may be limited by a min SINR threshold, a max number of peaks, etc.

Figure 10:
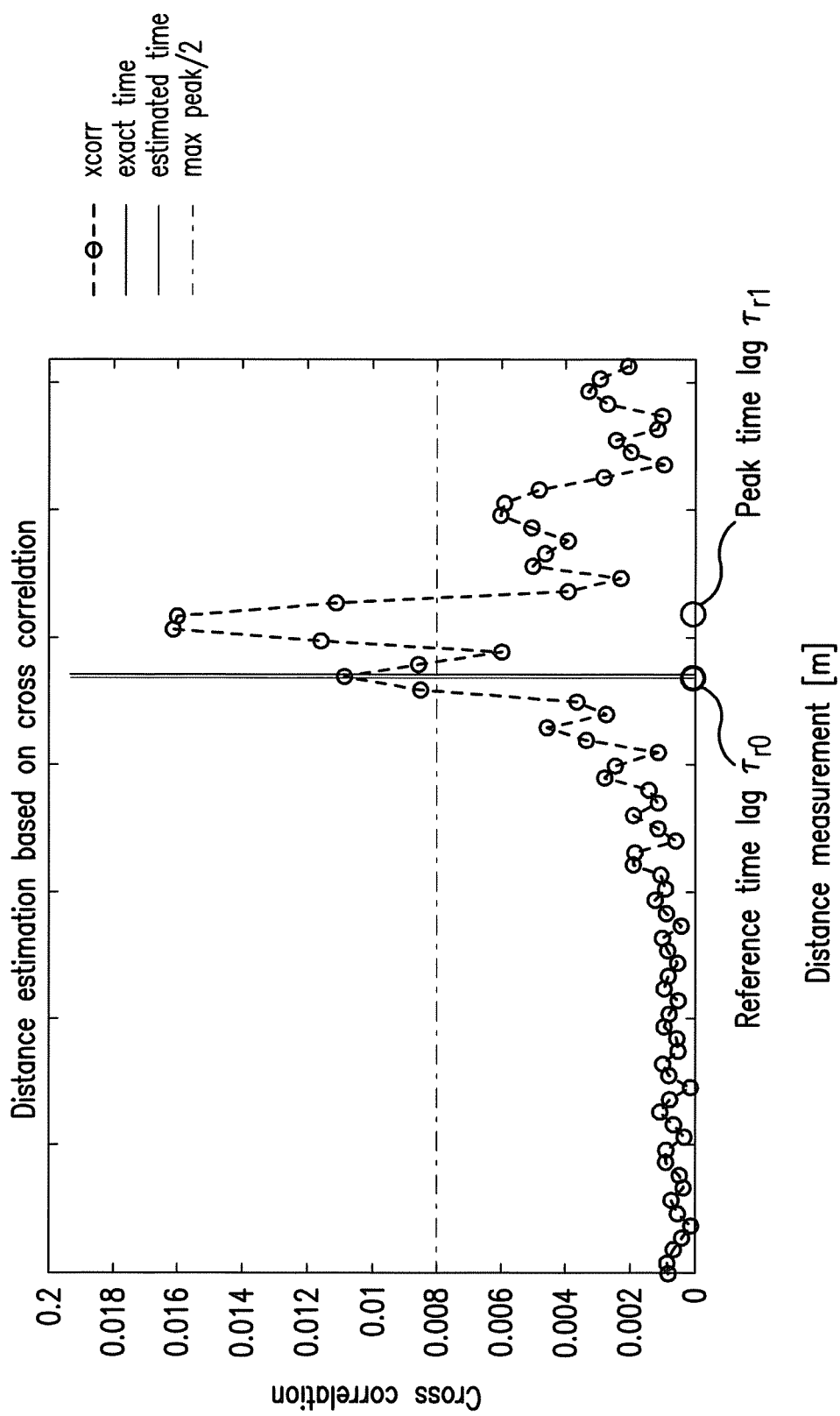
FIG. 10 illustrates an exemplary cross-correlation diagram.

In some embodiments, the PRS CFC includes a CF peak list. The CF peak list includes, for example, a reference cell peak time lag reference that is the time lag $T_{r0}$ of the first peak above the threshold. Alternatively, the time lag reference is the time lag of the strongest peak, the last peak above the threshold, or some other peak. FIG. 10 illustrates reference cell CF with reference cell time lag $T_{r0}$ and peak time lag $T_{r1}$. FIG. 10 illustrates an embodiment where the first peak among peaks above a threshold is selected to define the reference cell peak time lag.

Figure 11:
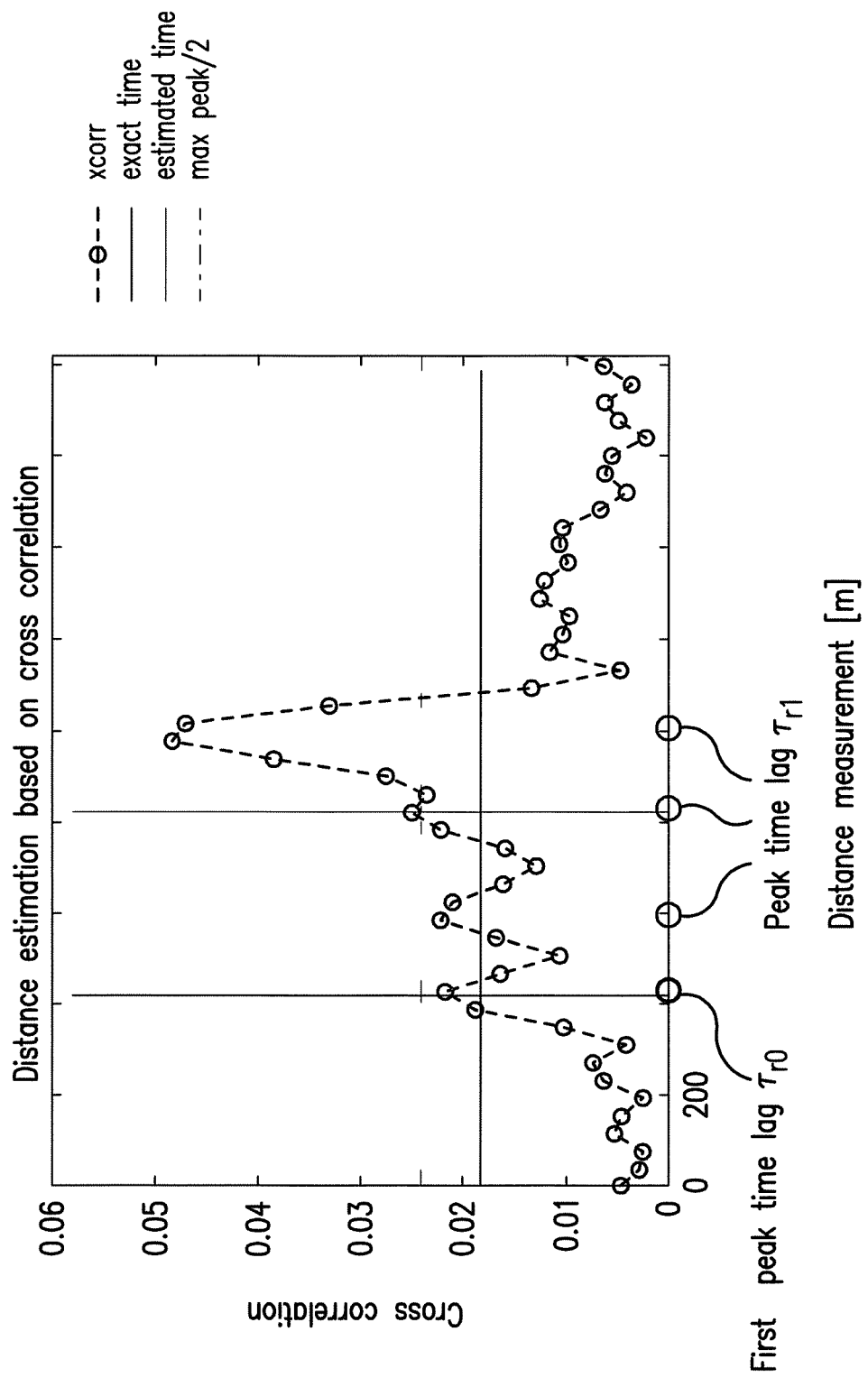
FIG. 11 illustrates an exemplary cross-correlation diagram.

According to some embodiments, the CF peak list may further include a RSTD per neighbor cell that reflects the time lag $T_{n0}$ of the first peak relative the reference cell time lag reference $T_{r0}$, (i.e., $\Delta T_{n0}=T_{n0}-T_{r0}$). In some embodiments, the RSTD may reflect the time lag of the strongest peak, the last peak, or some other peak relative to the reference cell time lag reference. FIG. 11 illustrates a neighbor cell CF with first peak time lag $T_{n0}$ and time lag or other peaks $T_{ri}$. FIG. 11 illustrates an embodiment where the first peak among peaks above a threshold is selected to define the neighbor cell peak time lag.

According to some embodiments, CF info of the reference cell comprises (i) the time lag $T_{ri}$ relative the time lag reference $T_{r0}$ (i.e., $\Delta T_{ri}=T_{ri}-T_{r0}$), (ii) the cross-correlation level, and (iii) the width of other peaks above the threshold, which may be limited by a max number.

According to some embodiments, CF info of a neighbor cell comprises (i) the time lag $T_{ni}$ relative the time lag reference $T_{r0}$ (i.e., $\Delta T_{ni}=T_{ni}-T_{r0}$), (ii) the level, (iii) the width of other peaks above the threshold, possibly limited by a max number. In some embodiments, the CF Info component includes (i) the time lag $T_{ni}$ relative RSTD $\Delta T_{n0}$ minus the time lag reference $T_{r0}$, (i.e., $\Delta \tilde{T}_{ni}=T_{ni}-(\Delta T_{n0}-T_{r0})$). This means the time lag relative the time lag of the neighbor cell peak that was used for RSTD calculation.

In some embodiments, the CF Info component (ii) could be reported relatively to the peak level of $T_{r0}$.

In some embodiments, the PRS CFC includes a CF list that is the same as the CF peak list, but with finer time granularity to include not only the peaks but also a sampled CF. The sampled CF is thus a representation of the correlation between the transmitted and the received signal sampled at different time lags. That is, at certain values of τ in (1) or (2).

Figure 12:
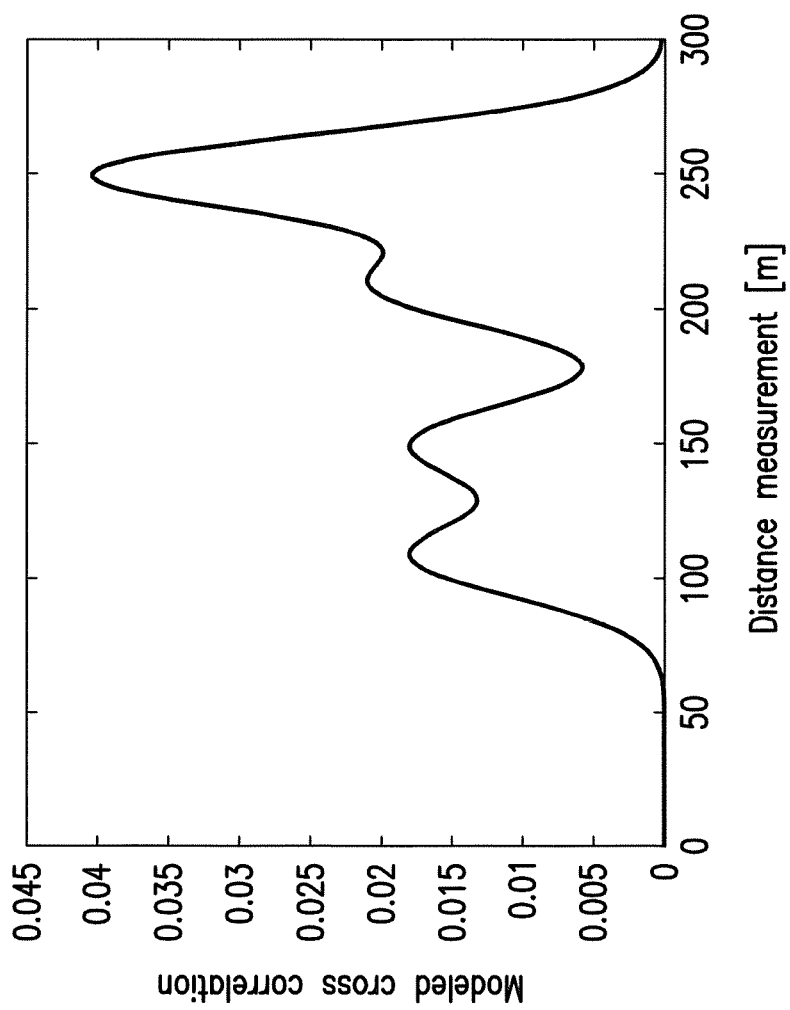
FIG. 12 illustrates an exemplary cross-correlation chart.

In some embodiments, the PRS CFC includes a CF model list that is similar to the CF peak list, but instead a model is estimated to represent the CF, and the model parameters are provided in the CF model list. An example model of the CF is a Gaussian mixture:

$$ACF(x)=\Sigma_i \theta_i g(x,\mu_i,\sigma_i)$$

where $g(x,\mu\_i,\sigma\_i)$ is a Gaussian distribution with mean $\mu\_i$ and standard deviation $\sigma\_i$, and $\theta\_i$ is a weight. The model parameters can for example be estimated using the Expectation Maximization (EM) algorithm. FIG. 12 provides an example with an CF Gaussian mixture model with four terms for the CF in FIG. 4.

In some embodiments, the correlation function is represented using fewer parameters in a transformed domain. For example, using fewer basis functions or fitting a model to the transformed correlation function. In this case, either the parameters associated with the basis functions and/or the fitted model can be included in the CF model list.

One approach for estimating TOA is to estimate channel impulse response using an assumed model, for example, a model that consists of summation of a certain number of time delayed Sinc (cardinal sine) functions. The Sinc functions may have different amplitudes. In this case, CF model list can included the parameters associated with the model such as relative time delays and/or relative amplitudes.

The PRS CFC may include Groupwise PRS correlation function characteristics information, where the data as above is prepared per group, which is reported separately. FIG. 13 illustrates an embodiment of a representation of the CF list parameters in a message information element.

There are several uses of having the knowledge of PRS correlation characteristics, which can improve the overall position estimation accuracy. One use is an improved estimation of RSTD measurement error. With the PRS correlation function characteristics information, the network node can derive more precise assumptions about the RSTD measurement error. For example in the scenario in FIG. 2 with three cells and cell 3 as reference cell, one can compile the following two equations on the UE side:

$$\Delta T_{n0\_13} = T_{n0\_13} - T_{r0\_13} + e\_13,$$

$$\Delta T_{n0\_23} = T_{n0\_23} - T_{r0\_23} + e\_23.$$

With only an error estimate per RSTD as in conventional techniques, each error term above is modelled crudely. Instead, with the PRS correlation characteristics, the RSTD error distribution can be more precisely modeled. In some embodiments, the error representation of e_13 is obtained from the error representation of the TOA of cell 1 combined with the error representation of the TOA of cell 3. The error distribution of e_13 is the compiled error distribution of the TOA of cell 1 convolved with the compiled error distribution of the TOA of cell 3. Given a measurement of $\Delta T_{n0\_13}$ and information about the error distribution one can formulate the likelihood of different UE position candidates $P_i$.

In relation to known base station positions $P_{BS1}$ and $P_{BS3}$. At the location server, one can formulate $$\Delta T_{n0\_13} = |P_i - P_{BS1}| - |P_i - P_{BS3}| + e\_13$$

Denote the assumed RSTD error distribution pe13(x), we get the likelihood for one RSTD measurement as:

$$Pe13(\Delta T_{n0\_13} - |P_i - P_{BS1}| + |P_i - P_{BS3}|)$$

for all different position candidates Pi.

Figure 4:
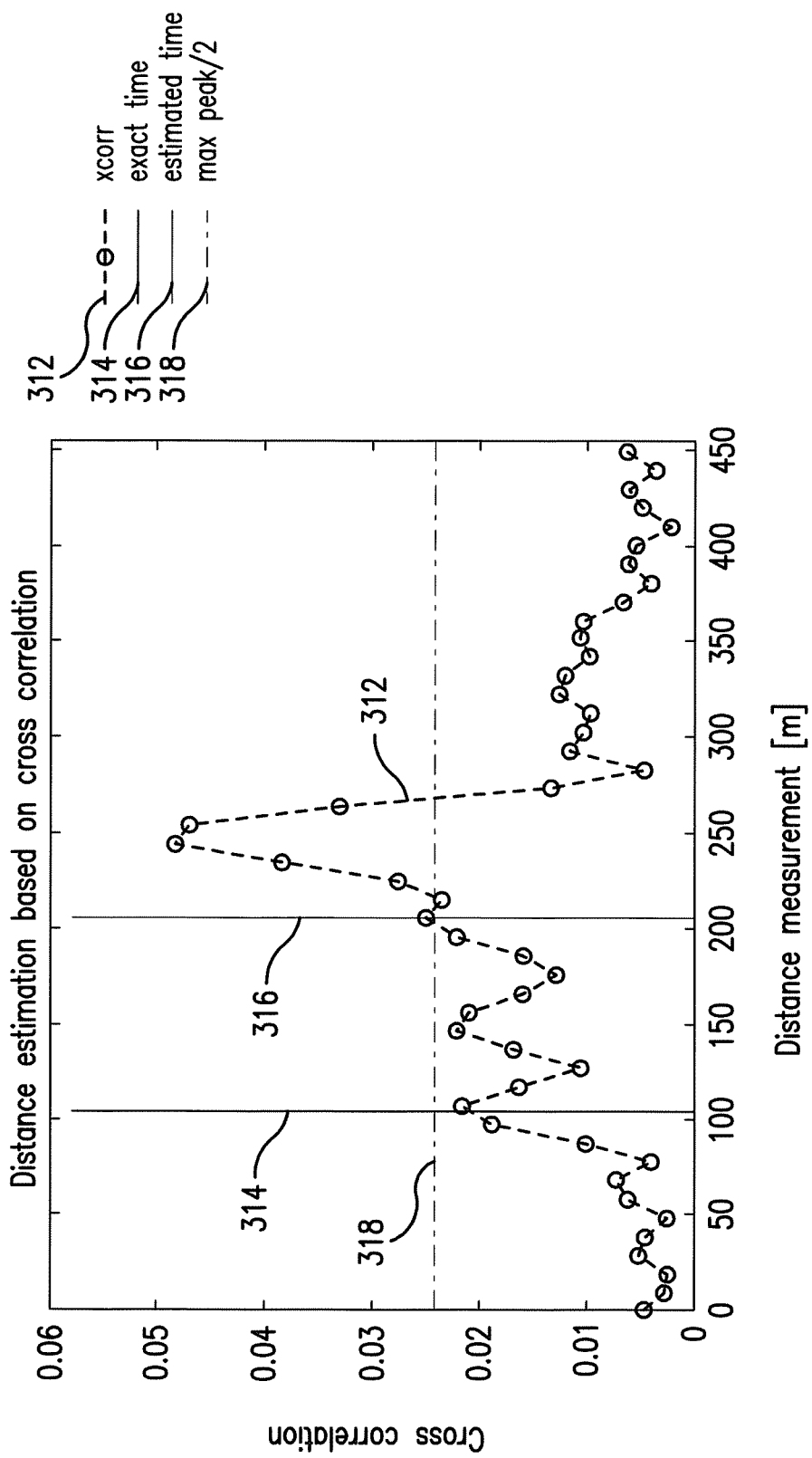
FIG. 4 illustrates an exemplary cross-correlation diagram.
Figure 5:
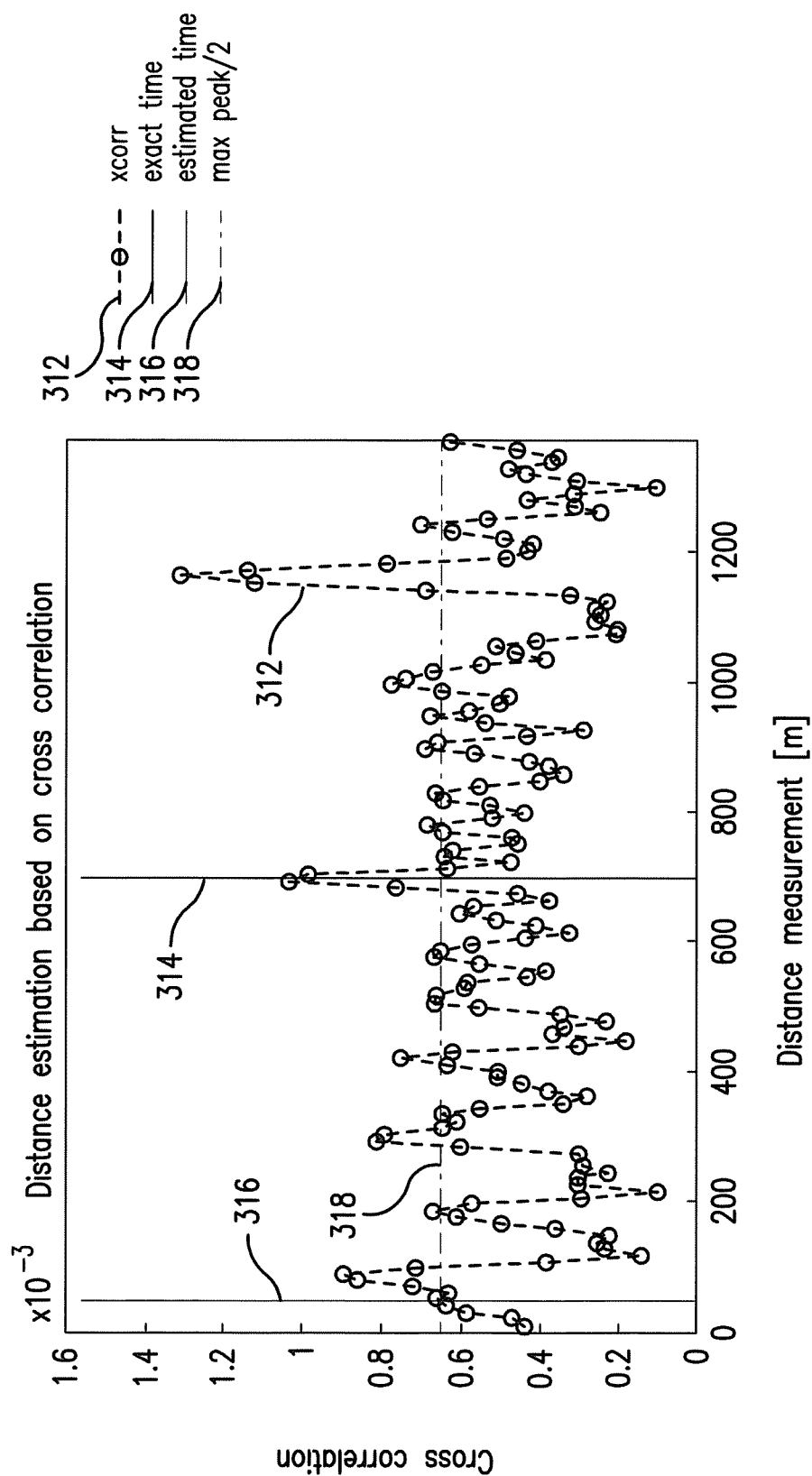
FIG. 5 illustrates an exemplary cross-correlation diagram.
Figure 14:
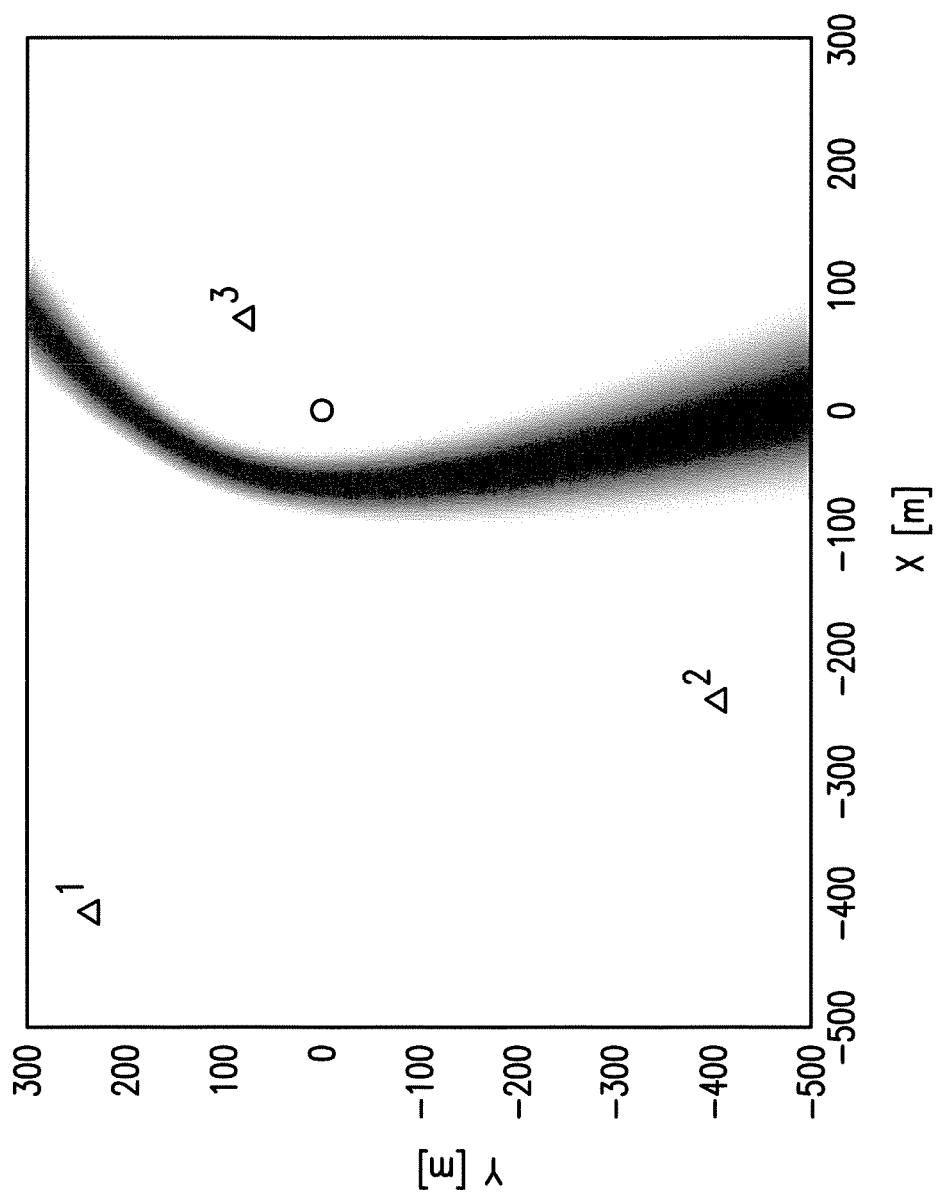
FIG. 14 illustrates an exemplary chart.

To illustrate the benefits of the detailed error distribution, consider the situation in FIG. 2 and use cell 3 as reference cell, where it is assumed that TOA of cell 3 is estimated according to FIG. 4, and TOA of cell 1 is estimated according to FIG. 3. If the error distribution is compiled based on thresholded TOA, the RSTD will be subject to a 100$m$ bias as indicated by FIG. 4. The resulting spatial likelihood of the RSTD between cell 1 and 3 is illustrated by FIG. 14, where a large likelihood corresponds to a dark color and vice versa. The true UE position is marked by 'o'. Thus, the bias in the measurement due to the incorrect peak selection in the UE causes the error representation to fail to model the true error.

Figure 15:
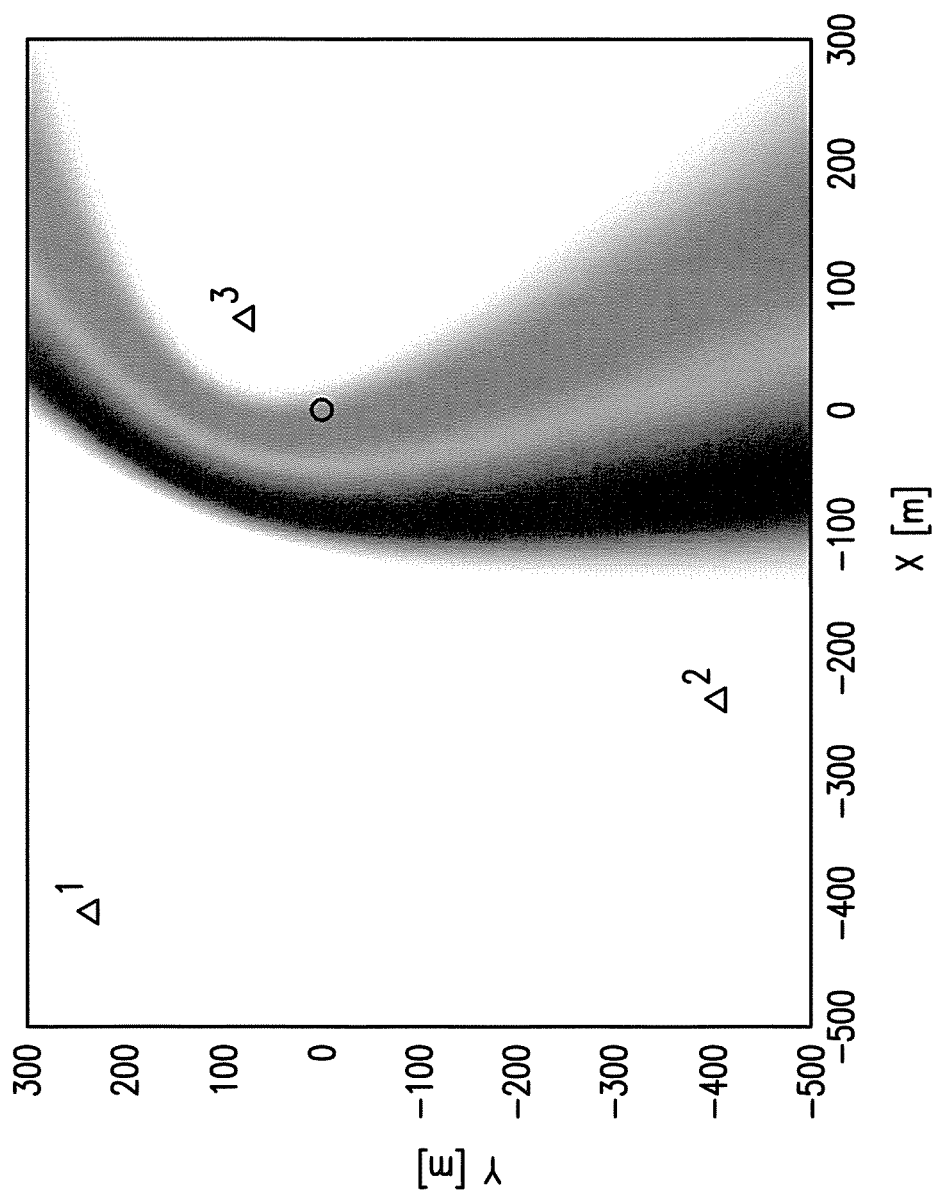
FIG. 15 illustrates an exemplary chart.

If the PRS correlation function characteristics feedback is instead considered, then all significant peaks in FIG. 4 are represented, also the true one corresponding to no bias. As seen in FIG. 15, the true position of the UE is now covered by the error representation.

Now, considering all measurements, and form the total likelihood, for example by assuming that the likelihood per measurement is independent so that the total likelihood can be obtained as the following product:

$$(P_i) = \prod_{m \neq m_r} p_{e13}(\Delta T_{n0_{mm_r}} - |P_i - P_{BSm}| + |P_i - P_{BSm_r}|)$$

Then, the positioning estimate can be obtained as the maximizing argument $$\hat{P}_i = \underset{P_i}{\arg\max}\, L(P_i)$$

With the more precise error representation, a positioning algorithm striving to maximize the likelihood will be more capable of finding an accurate position estimate than an algorithm using a crude error representation. The most likely position estimates are those that correspond to the biased peaks, but the true position corresponds to a non-negligible likelihood.

Another use is indoor/outdoor user/UE classification. Based on the reported correlation characteristics, the network can determine if the UE is indoor/outdoor. For example, such a classification can be made based on delay spread which can be estimated from the reported correlation characteristics.

Another use is reference cell selection. Depending on the reported correlation characteristics, the network can determine which cell is most suitable candidate to be used as a reference for a particular UE. This information can then conveyed to the UE.

Another use is dynamic PRS configuration. With the improved estimation of RSTD measurement error reported from each UE, the network node may establish the statistics for RSTD errors. Based on this, the network node may dynamically adjust the PRS configuration parameters for targeting performance. For example, if the expected or average RSTD error is rising, PRS transmission may be configured to have more resources.

According to some embodiments, the PRS configuration parameters may include at least one or a combination of the following:

(i) PRS bandwidth.

(ii) Number of DL Frames (Number of consecutive downlink subframes in one occasion).

(iii) PRS Configuration Index (related to PRS periodicity).

Figure 16:
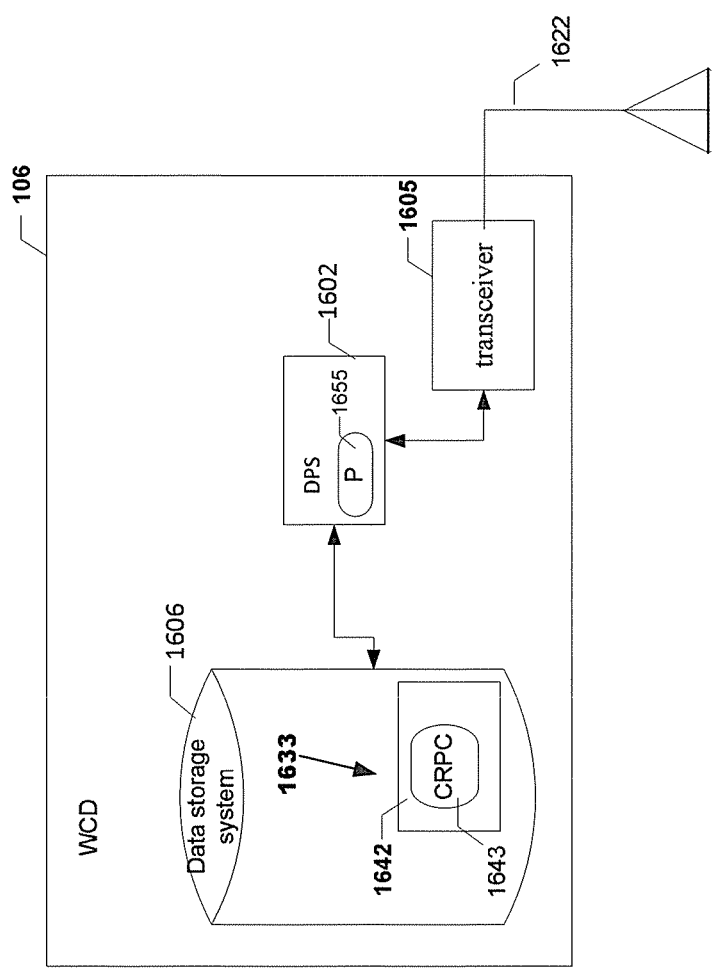
FIG. 16 illustrates an exemplary wireless communication device.

FIG. 16 illustrates a block diagram of an example of the WCD 106. As shown in FIG. 16, WCD 106 may include: the data processing system (DPS) 1602 (which includes, e.g., a digital signal processing circuit (DSP), which may include one or more processing circuits (P) 1655 (e.g., microprocessors) and/or one or more circuits, such as an application specific integrated circuit (ASIC), Field-programmable gate arrays (FPGAs), etc.; a transceiver 1605, each connected to an antenna 1622, for wirelessly transmitting and receiving information, respectively; a data storage system 1606, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1602 includes a processing circuit 1655 (e.g., a microprocessor), a computer program product 1633 may be provided, which computer program product includes: computer readable program code 1643 (e.g., instructions), which implements a computer program, stored on a computer readable medium 1642 of data storage system 1606, such as, but not limited, to magnetic media (e.g., a hard disk), optical media (e.g., a DVD), memory devices (e.g., random access memory), etc. In some embodiments, computer readable program code 1643 is configured such that, when executed by data processing system 1602, code 1643 causes the data processing system 1602 to perform steps described herein (e.g., steps shown in FIGS. 5-8).

In some embodiments, WCD 106 is configured to perform steps described above without the need for code 1643. For example, data processing system 1602 may consist merely of specialized hardware, such as one or more application-specific integrated circuits (ASICs). Hence, the features of the present invention described above may be implemented in hardware and/or software. For example, in some embodiments, the functional components of WCD 106 described above may be implemented by data processing system 1602 executing program code 1643, by data processing system 1601 operating independent of any computer program code 1643, or by any suitable combination of hardware and/or software. In a second embodiment, WCD 106 further includes: 1) a display screen coupled to the data processing system 1602 that enables the data processing system 1602 to display information to a user of WCD 106; 2) a speaker coupled to the data processing system 1602 that enables the data processing system 1602 to output audio to the user of UE 1602; and 3) a microphone coupled to the data processing system 1602 that enables the data processing system 1602 to receive audio from the user.

Exemplary Network Node

Figure 17:
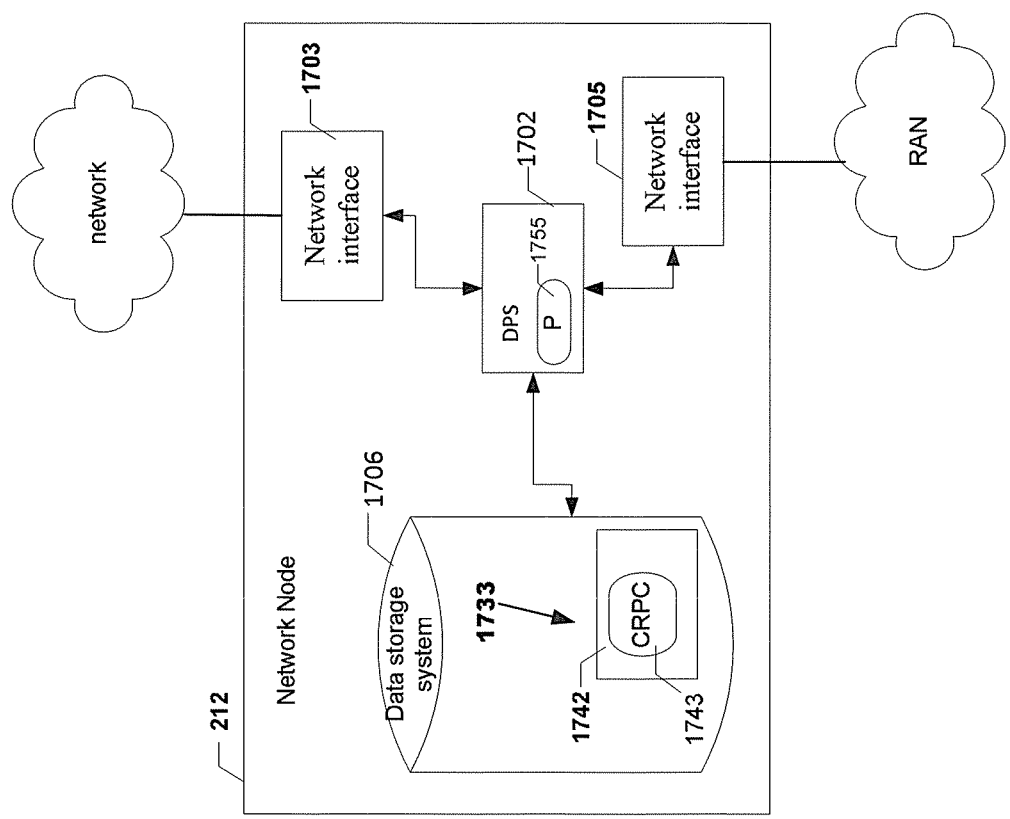
FIG. 17 illustrates an exemplary network node.

FIG. 17 illustrates a block diagram of an example of network node 212. As shown in FIG. 17, the network node may include: a data processing system 1702, which may include one or more processing circuits 1755 (e.g., microprocessors) and/or one or more circuits, such as an application specific integrated circuit (ASIC), Field-programmable gate arrays (FPGAs), etc.; a base station interface 1705 for receiving message from, and transmitting messages to, a RAN; a network interface 1703 for interfacing with other core network components, a data storage system 1706, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)).

In embodiments where data processing system 1702 includes a processing circuit (e.g., a microprocessor), a computer program product 1733 may be provided, which computer program product includes: computer readable program code 1743 (e.g., instructions), which implements a computer program, stored on a computer readable medium 1742 of data storage system 1706, such as, but not limited, to magnetic media (e.g., a hard disk), optical media (e.g., a DVD), memory devices (e.g., random access memory), etc. In some embodiments, computer readable program code 1743 is configured such that, when executed by data processing system 1702, code 1743 causes the data processing system 1702 to perform steps described herein. In some embodiments, network node 212 may be configured to perform steps described above without the need for code 1743. For example, data processing system 1702 may consist merely of specialized hardware, such as one or more application-specific integrated circuits (ASICs). Hence, the features of the present invention described above may be implemented in hardware and/or software.

Advantages

The advantages of the embodiments include, but are not limited to:

The PRS correlation function characteristics contain more information about the received PRS paths that RSTDs based on thresholded TOA estimates.

PRS correlation function characteristics enable the network node to estimate the UE position using multiple hypothesis concerning the PRS paths, thereby to a greater probability including the true (Line of Site) PRS paths.

PRS correlation function characteristics with data over multiple time instances enable the network node to also consider time correlation and mobility aspects of positioning.

By the more precise error representation included in the PRS correlation characteristics, the positioning algorithm striving to maximize the likelihood will be more capable of finding an accurate position estimate than an algorithm using a crude error representation.

PRS correlation function characteristics may also help the network to determine if the UE is indoor or outdoor, depending on the relevant propagation characteristics.

PRS correlation function characteristics can enable the network to provide further useful assistance in terms of reference cell selection.

Although terminology from 3GPP has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout.

Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits.

These computer program instructions may be provided to a processing circuit of a general purpose computer circuit, special purpose computer circuit, and/or other programmable data processing circuit to produce a machine, such that the instructions, which execute via the processing circuit of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processing circuit such as a digital signal processing circuit, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts.

Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

CF Correlation Function
CFC Correlation Function Characteristics
CIR Channel Impulse Response
e-CID enhanced Cell ID
eNB evolved Node B
E-SMLC Evolved-Serving Mobile Location Centre
GNSS Global Navigation Satellite System
LOS Line Of Site
LPP LTE Positioning Protocol
OTDOA Observed Time Difference Of Arrival
PDP Profile Delay Profile
PRS Positioning Reference Signal
RAP Receiver Assistance Policy
RRC Radio Resource Control
RSTD Reference Signal Time Difference
SNR Signal to Noise Ratio
UTDOA Uplink Time Difference of Arrival
TDOA Time Difference of Arrival
TOA Time of Arrival WCD Wireless Communication Device

The invention claimed is:

1. A method performed in a wireless communication device (WCD) in communication with a network having a network node and a plurality of base stations, the method comprising:
the WCD determining, for each base station from the plurality of base stations, a reference time lag and a first time lag, the reference time lag and the first time lag being determined based on a Position Reference Signal (PRS) received from the base station;
the WCD transmitting a report to the network node, the report comprising a relative time lag for each base station from the plurality of base stations, wherein the relative time lag represents a difference between the first time lag and the reference time lag.

2. The method of claim 1, wherein, for each base station, the reference time lag and the first time lag are determined based on candidate times of arrival of the PRS and wherein the candidate times of arrival represent multiple paths of the PRS.

3. The method of claim 1, wherein, for each base station, the reference time lag and the first time lag are determined based on peaks in a cross-correlation function between the PRS received from the base station and a stored representation of the PRS.

4. The method of claim 1, wherein, for each base station, the reference time lag is a time lag of one of a first peak above a predefined threshold, the largest peak above the predefined threshold, and the last peak above the predefined threshold.

5. The method of claim 1, wherein the report further includes a reference signal time difference (RSTD) for each neighbor cell relative to a reference cell.

6. The method of claim 1, further comprising:
the WCD receiving a request for location information in response to a determination that a predetermined condition is met, wherein the determining of the reference time lag and the first time lag is performed in response to receiving the request.

7. The method of claim 1, wherein the report is a location information report.

8. The method of claim 3, wherein the report further comprises a width of one or more peaks in the cross-correlation function.

9. The method of claim 3, wherein the report further comprises a level of one or more peaks in the cross-correlation function.

10. A wireless communication device (WCD) in communication with a network having a network node and a plurality of base stations, the wireless communication device comprising:
a transceiver;
a processing circuit; and
a storage storing instructions that, when executed by the processing circuit, cause the WCD to:
determine, for each base station from the plurality of base stations, a reference time lag and a first time lag, the reference time lag and the first time lag being determined based on a Position Reference Signal (PRS) received from the base station, and
transmit a report to the network node, the report comprising a relative time lag for each base station from the plurality of base stations, wherein the relative time lag represents a difference between the first time lag and the reference time lag.

11. The WCD of claim 10, wherein, for each base station, the reference time lag and the first time lag are determined based on candidate times of arrival of the PRS and wherein the candidate times of arrival correspond to multiple paths of the PRS.

12. The WCD of claim 10, wherein, for each base station, the reference time lag and the first time lag are determined based on peaks in a cross-correlation function between the PRS received from the base station and a stored representation of the PRS.

13. The WCD of claim 10, wherein, for each base station, the reference time lag is a time lag of one of a first peak above a predefined threshold, the largest peak above the predefined threshold, and the last peak above the predefined threshold.

14. The WCD of claim 10, wherein the report further includes a reference signal time difference (RSTD) for each neighbor cell relative to a reference cell.

15. The WCD of claim 10, wherein the WCD is further configured to receive a request for location information in response to a determination that a predetermined condition is met and wherein the determining of the reference time lag and the first time lag is performed in response to receiving the request.

16. The WCD of claim 10, wherein the report is a location information report.

17. The WCD of claim 12, wherein the report further comprises a width of one or more peaks in the cross-correlation function.

18. The WCD of claim 12, wherein the report further comprises a level of one or more peaks in the cross-correlation function.

19. A method performed in a wireless communication device (WCD) in communication with a network having a network node and a plurality of base stations, the method comprising:
the WCD determining, for each base station from the plurality of base stations, a reference time lag and a first time lag, the reference time lag and the first time lag being determined based on one or more Position Reference Signals (PRS) received from one or more of the plurality of base stations;
the WCD transmitting a report to the network node, the report comprising a relative time lag for each base station from the plurality of base stations, wherein the relative time lag represents a difference between the first time lag and the reference time lag.

20. The method of claim 19, wherein, for each base station, the reference time lag and the first time lag are determined based on candidate times of arrival of the one or more PRSs and wherein the candidate times of arrival represent multiple paths of the PRS.

* * * * *

UNITED STATES PATENT AND TRADEMARK OFFICE
CERTIFICATE OF CORRECTION

PATENT NO. : 10,708,881 B2
APPLICATION NO. : 16/577674
DATED : July 7, 2020
INVENTOR(S) : Gunnarsson et al.

It is certified that error appears in the above-identified patent and that said Letters Patent is hereby corrected as shown below:

In the Drawings

In Fig. 17, Sheet 17 of 17, for Tag "1705", in Lines 1-2, delete "Network interface" and insert -- Base station interface --, therefor.

In the Specification

In Column 4, Line 10, delete "2018," and insert -- 2018, now Pat. No. 10,433,276, --, therefor.

In Column 4, Lines 3-4, delete "(MME) 254" and insert -- (MME) 214 --, therefor.

In Column 4, Line 16, delete ""tap""" and insert -- "tap" --, therefor.

In Column 7, Line 55-56, delete "CFC Info (Correlation Function Information)." and insert -- CFC Info (Correlation Function Characteristics Information). --, therefor.

In Column 8, Line 8, delete "relative the" and insert -- relative to the --, therefor.

In Column 8, Line 9, delete "$T_{r0}$," and insert -- $T_{r0}$ --, therefor.

In Column 8, Line 18, delete "relative the" and insert -- relative to the --, therefor.

In Column 8, Line 23, delete "relative the" and insert -- relative to the --, therefor.

In Column 8, Line 28, delete "$T_{r0}$," and insert -- $T_{r0}$ --, therefor.

In Column 8, Line 29, delete "relative the" and insert -- relative to the --, therefor.

In Column 8, Line 64, delete "can included" and insert -- can include --, therefor.

Signed and Sealed this
Twenty-ninth Day of September, 2020

Andrei Iancu
*Director of the United States Patent and Trademark Office*

In Column 11, Lines 10-11, delete "data processing system 1601" and insert -- data processing system 1602 --, therefor.

In Column 11, Line 19, delete "UE 1602;" and insert -- UE 106; --, therefor.

In Column 14, Lines 45-46, delete "WCD Wireless Communication Device" and insert the same at Line 46 as a new line.